United States Patent
Gildea

(10) Patent No.: US 11,122,873 B2
(45) Date of Patent: Sep. 21, 2021

(54) ANTIMICROBIAL, ANTIBACTERIAL, AND ANTI-FUNGAL REVERSIBLE ATHLETIC BAG WITH DUAL PURPOSE STRAP

(71) Applicant: Lori Gildea, Doylestown, PA (US)

(72) Inventor: Lori Gildea, Doylestown, PA (US)

(73) Assignee: Lori Gildea, Doylestown, PA (US)

( * ) Notice: Subject to any disclaimer, the term of this patent is extended or adjusted under 35 U.S.C. 154(b) by 323 days.

(21) Appl. No.: 16/039,796

(22) Filed: Jul. 19, 2018

(65) Prior Publication Data

US 2019/0021462 A1    Jan. 24, 2019

Related U.S. Application Data

(60) Provisional application No. 62/534,361, filed on Jul. 19, 2017.

(51) Int. Cl.
| | |
|---|---|
| *A45C 3/00* | (2006.01) |
| *A45C 13/30* | (2006.01) |
| *A45C 13/10* | (2006.01) |
| *A45C 13/02* | (2006.01) |
| *A45F 3/02* | (2006.01) |
| *A45F 3/04* | (2006.01) |
| *A45F 4/06* | (2006.01) |
| *A45C 15/00* | (2006.01) |

(Continued)

(52) U.S. Cl.
CPC ............ *A45C 3/001* (2013.01); *A45C 13/02* (2013.01); *A45C 13/103* (2013.01); *A45C 13/1046* (2013.01); *A45C 13/30* (2013.01); *A45C 15/00* (2013.01); *A45F 3/02* (2013.01); *A45F 3/04* (2013.01); *A45F 4/06* (2013.01); *A45C 2003/007* (2013.01); *A45C 2003/008* (2013.01); *B32B 27/30* (2013.01); *B32B 27/40* (2013.01); *B32B 2255/10* (2013.01); *B32B 2255/26* (2013.01); *B32B 2307/7145* (2013.01); *B32B 2439/46* (2013.01)

(58) Field of Classification Search
CPC ...... A45F 3/02; A45F 3/04; A45F 4/02; A45C 2013/223
See application file for complete search history.

(56) References Cited

U.S. PATENT DOCUMENTS

| | | | |
|---|---|---|---|
| 4,286,697 A * | 9/1981 | Baker | A45F 3/02 224/612 |
| 5,402,744 A * | 4/1995 | Matamoros | B63B 32/80 114/55.5 |

(Continued)

*Primary Examiner* — James N Smalley
*Assistant Examiner* — Jennifer Castriotta
(74) *Attorney, Agent, or Firm* — Volpe Koenig

(57) ABSTRACT

An athletic bag comprising a body having antibacterial, antimicrobial, and antifungal properties on one or both sides of the body and a detachable dual-purpose carrying strap that may also serve as fitness equipment is provided. The bag may be reversible. The body may further comprise a fabric having a silver-treated coating. The body may also further comprise a fabric having an embedded silver component. The bag may also include at least one insert to store various items. The bag may also include a thermal pouch, a compartment to visually and audibly display electronic devices, and an antibacterial monitor that measures the growth of bacteria in the bag. The bag may also include an attachment for an exercise mat.

13 Claims, 15 Drawing Sheets

(51) Int. Cl.
*B32B 27/30* (2006.01)
*B32B 27/40* (2006.01)

(56) References Cited

U.S. PATENT DOCUMENTS

| | | | | |
|---|---|---|---|---|
| 2002/0026798 | A1* | 3/2002 | Zorn | A45C 11/20 62/3.62 |
| 2010/0200129 | A1* | 8/2010 | Polozzolo | A47G 9/1045 150/105 |
| 2010/0224294 | A1* | 9/2010 | Svenson | A45C 3/001 150/103 |
| 2010/0284631 | A1* | 11/2010 | Lee | A45C 3/06 383/12 |
| 2011/0131723 | A1* | 6/2011 | Andrews | A63B 21/0004 5/417 |
| 2012/0029458 | A1* | 2/2012 | Norman | A45C 7/0063 604/385.14 |
| 2012/0267017 | A1* | 10/2012 | Sloan | A45F 3/04 150/103 |
| 2014/0238560 | A1* | 8/2014 | Fair | A45C 3/001 150/106 |
| 2014/0309088 | A1* | 10/2014 | Buikema | A63B 21/0603 482/93 |
| 2015/0225164 | A1* | 8/2015 | Seiders | A45C 13/103 220/592.25 |
| 2017/0022640 | A1* | 1/2017 | Schenk | D04B 21/20 |
| 2018/0303211 | A1* | 10/2018 | Nowak | A45C 7/0086 |

\* cited by examiner

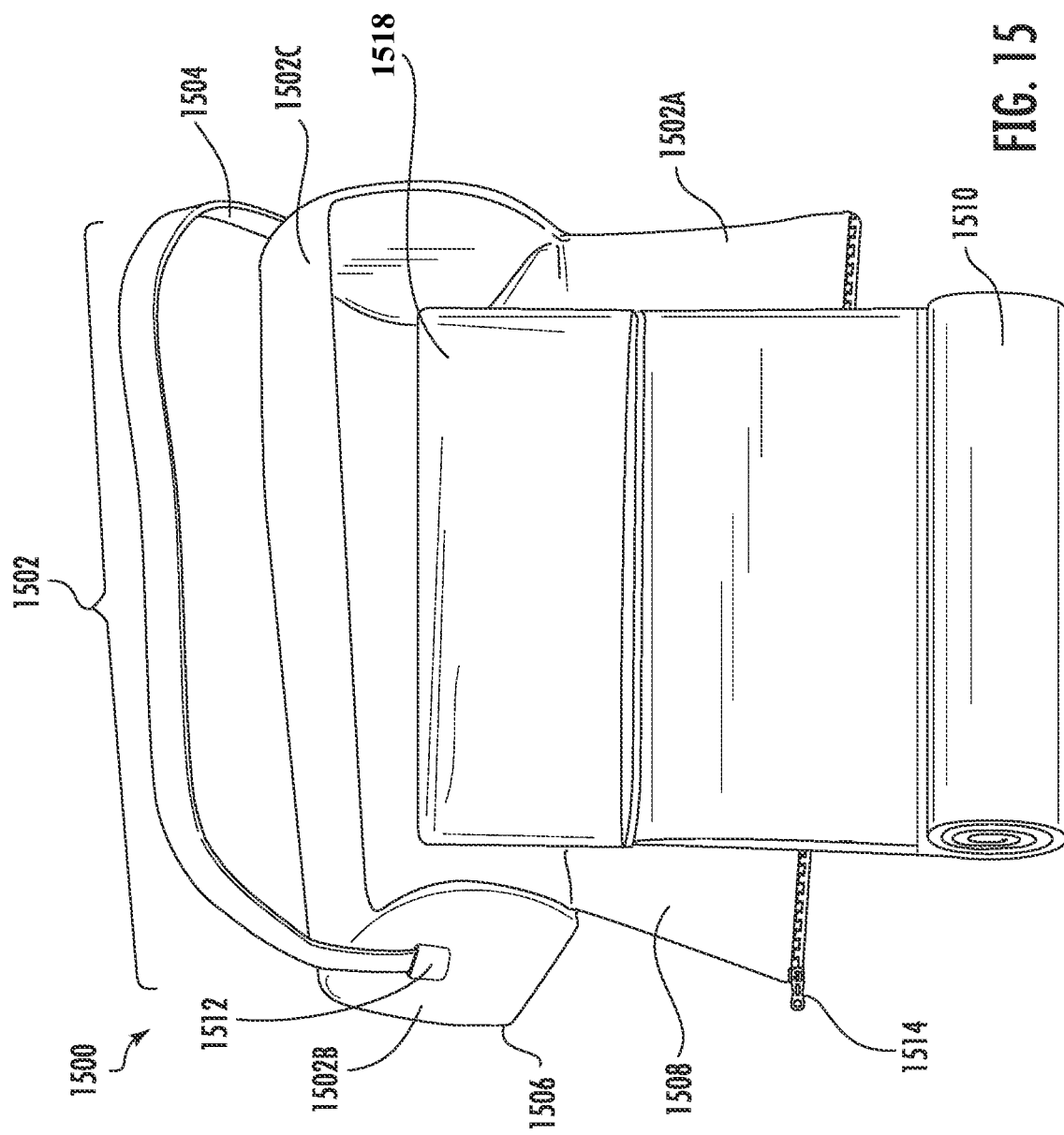

ANTIMICROBIAL, ANTIBACTERIAL, AND ANTI-FUNGAL REVERSIBLE ATHLETIC BAG WITH DUAL PURPOSE STRAP

SUMMARY

An athletic bag comprises a body having antibacterial, antimicrobial, and antifungal properties on one or both sides of the body and a detachable dual-purpose carrying strap that may also serve as fitness equipment. The athletic bag may be reversible. The body may further comprise a fabric having a silver-treated coating. The body may also further comprise a fabric having an embedded silver component. The athletic bag may also include at least one insert to store various items.

BRIEF DESCRIPTION OF THE DRAWINGS

The present invention is illustrated by way of example, and not by way of limitation, in the figures of the accompanying drawings in which:

FIG. 15 is a diagram of a perspective view of an alternative embodiment of an athletic bag.

DETAILED DESCRIPTION OF THE PREFERRED EMBODIMENTS

Figure 1:
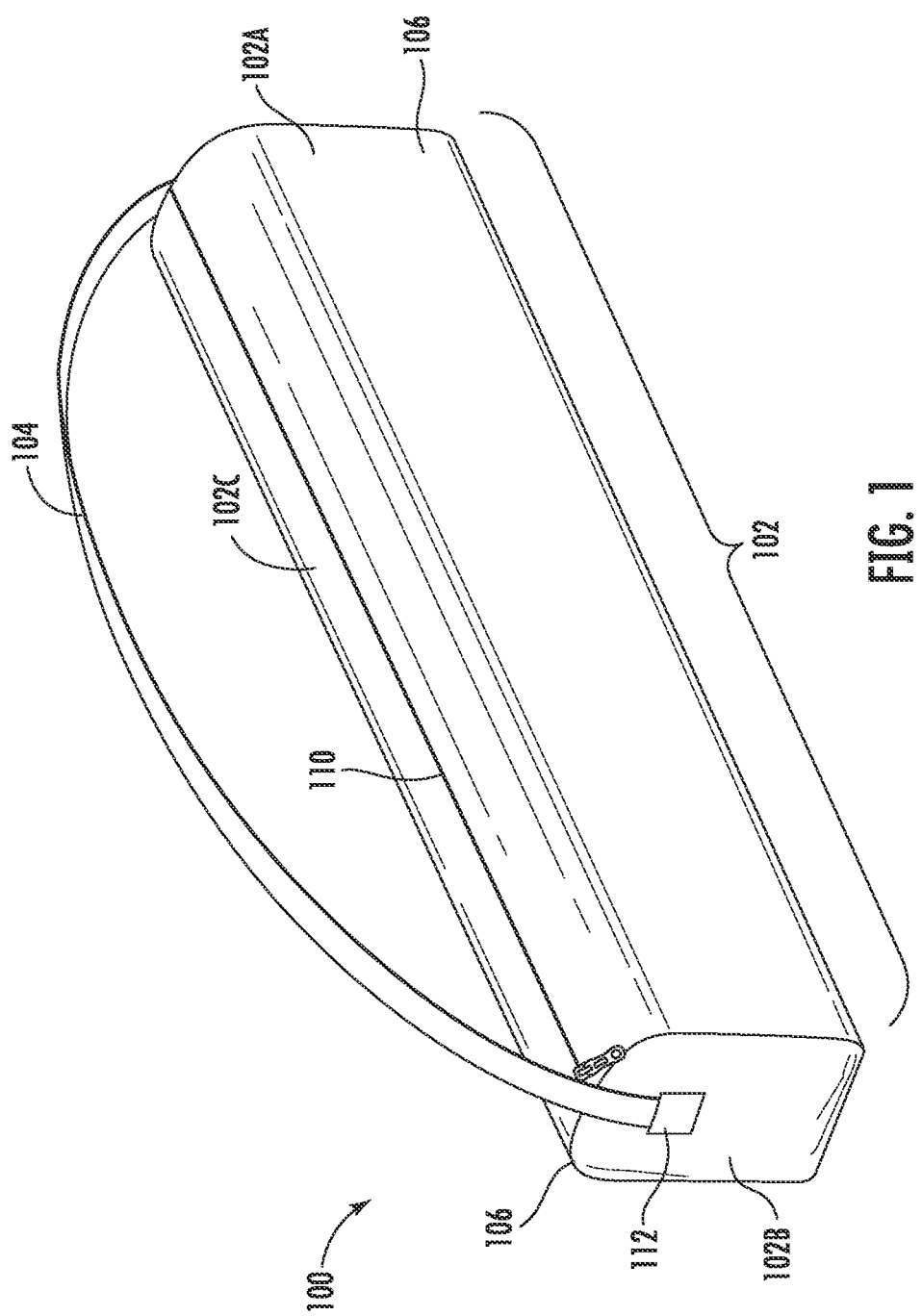
FIG. 1 is a diagram of a perspective view of an embodiment of an athletic bag.

Athletic bags are a popular asset for individuals participating in most recreational and travel activities. Athletic bags provide the ability to carry recreational materials, clothing, food, mobile devices, etc., making it easier to travel to and from various recreational activities and locations. These bags are essentially used in recreational spaces including gyms, schools, bathrooms, locker rooms, public spaces, and outdoors settings. These bags are also used while traveling on various transportation vehicles including automobiles, bicycles, trains, metros, and planes.

Current athletic bags may be oversized in order to accommodate large items used for recreational activities and travel. As a result, individuals traveling or participating in an activity that involves smaller equipment or less materials must carry around bulkier bags, and therefore require a more compact bag for transport and storage. Current compact bags, however, specifically for light recreational activities and fitness activities such as yoga, Pilates, or regular gym exercise, often cannot fit more than one piece of equipment (e.g., an exercise mat) that may be needed for the activity. This may inconvenience the user who requires multiple small items for exercise or travel (e.g., food and water, mobile devices, an exercise mat, exercise or stretching band, and/or yoga blocks).

In addition to lacking accommodating features, athletic bags are prone to harboring various types of bacteria, mold, and fungi growth. For example, when an athletic bag is placed on the floor of a gym, bathroom, or other public space, the bag can come into contact with bacteria including norovirus, *salmonella, staphylococcus, E. coli*, etc. In addition, storing damp or sweaty clothes in an athletic bag after a recreational activity can increase the rapid growth of bacteria, fungus, and mold spores. These microorganisms can be transported from the various environments listed above into personal environments (e.g., vehicles, offices, homes) and could potentially contaminate these spaces.

Current bags also typically do not possess antibacterial or antimicrobial properties to account for the bag's exposure to bacteria, mold, and fungi growth during recreational use or travel. Typical antibacterial bags may incorporate a silver coating on the bag's surface material, as silver kills hundreds of different types of bacteria and is known for its antibacterial efficacy in different fields. These bags, however, are currently not extremely effective in preventing the growth of bacteria, mold, and fungi, because the percentage of silver incorporated into the fabric is extremely low. The fabric comprising these bags therefore cannot kill large amounts of bacteria due to the low concentration of silver. The coatings also typically wear off with use. In addition, the silver or other antibacterial properties typically only comprise either the interior portion or the exterior portion of the bag, and not both. As a result, one portion of the bag may be constantly susceptible to bacteria, mold, and fungal growth.

It would be beneficial to offer an athletic bag that is antibacterial, antimicrobial, anti-fungal, or mold/mildew-resistant, with a dual purpose strap that can be used as recreational or travel equipment during recreational activities or travel to provide a compact and clean bag for use.

FIG. 1 is a diagram of a perspective view of an athletic bag 100 in accordance with the teachings herein. The athletic bag 100 comprises a body 102 and a strap 104. In the present embodiment, the body 102 may be similar in shape to a rectangular prism. However, that is just by way of example. In other embodiments, the body 102 may be any shape. The body 102 comprises an exposed outside 106 and a non-exposed inside (not depicted). In the present embodiment, the body 102 is reversible. In other embodiments, the body 102 may not be reversible. The outside 106 and the inside 108 of the body 102 may be made of similar material with antibacterial, antimicrobial, antifungal, and mold/mildew-resistant properties. The outside 106 and the inside 108 may also have stain, scuff, abrasion, and water-resistant and UV protection properties. The outside 106 and the inside 108 may also be crack-proof.

In the present embodiment as described hereinafter, the athletic bag 100 may be used to store recreational and travel materials, and for purposes of explanation, the athletic bag 100 will be described with reference to recreational and travel bags. However, those of skill in the art would realize that in other embodiments, the properties described may be applied to leisure, fashion, home, and work bags as well.

Returning to FIG. 1, in the present embodiment, the body 102 further comprises three similar proximal faces 102A, two similar distal end faces 102B, and a top proximal face 102C. The top proximal face 102C of the body 102 may include a zipper 110 to close and secure recreational equipment. The zipper 110 may be mold/mildew resistant. Both the outside 106 and the inside (not depicted) of the body 102 may include latches 112 to attach and detach the strap 104.

The strap 104 may be a dual-purpose strap. In the present embodiment, the strap 104 may serve as an exercise or yoga band, but that is just by way of example. The strap 104 may be made of a material that is flexible and conformable in order to be used as an exercise or stretching band, but also comfortable to carry and transport the athletic bag 100. The strap 104 may therefore be made of an elastic or other soft material with elastic and stretchable properties, and may also have antibacterial, mold/mildew-resistant and water-resistant webbing. The strap 104 may also be adjustable. In one embodiment, the strap 104 may serve as a travel belt that can be attached around a user and can allow various recreational and travel items to be attached along the length of the belt. In other embodiments, the strap 104 may serve as other types of recreational equipment such as an exercise or stretching band. This will allow for the bag to be more compact because it does not have to incorporate room for exercise or stretching bands, but also provide convenience in carrying the bag to recreational activities.

Figure 2:
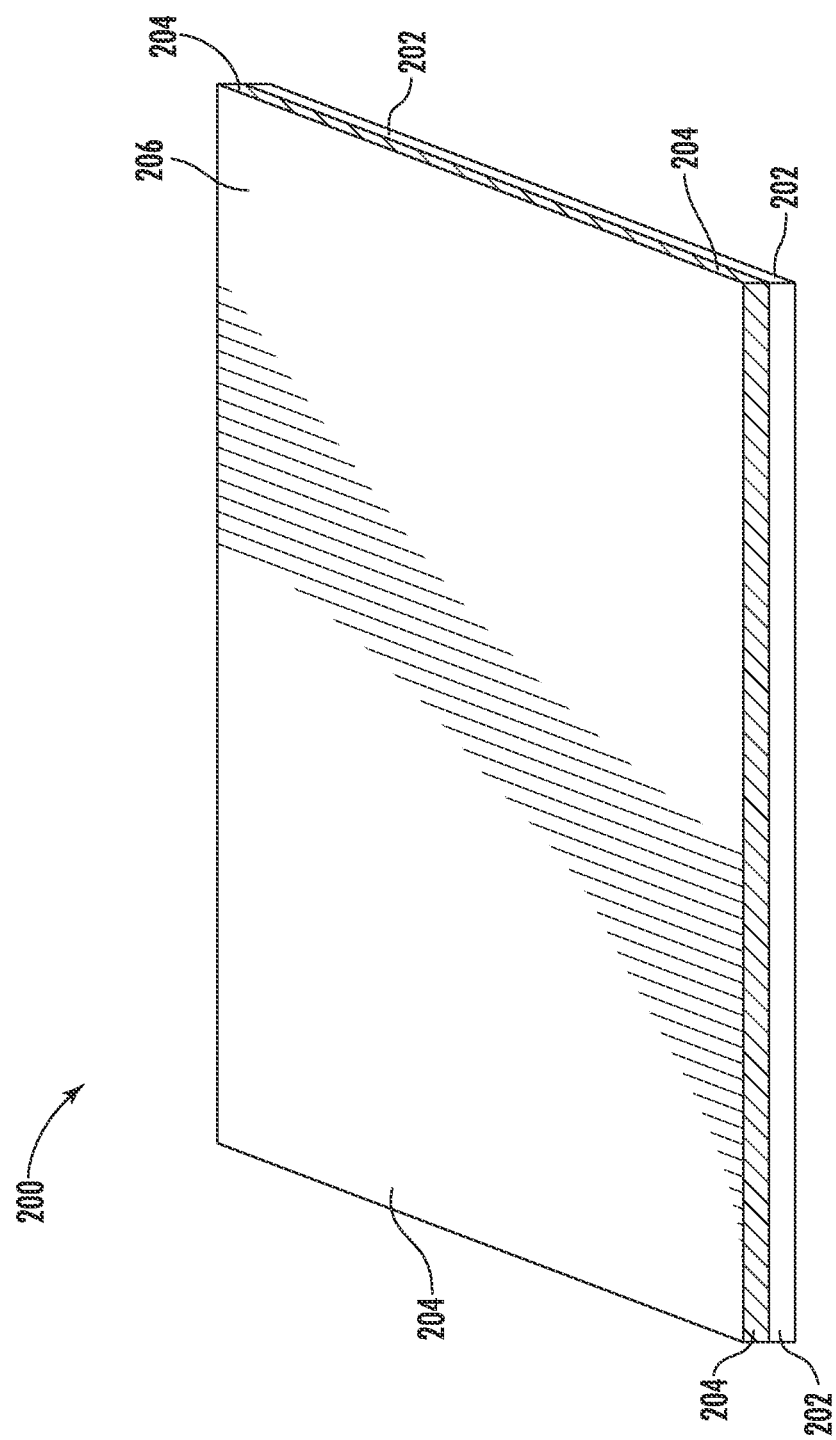
FIG. 2 is a diagram of a perspective view of a portion of a material for the outside and inside of an athletic bag.

FIG. 2 is a diagram of a perspective view of a portion of a material 200 for the outside 206 and inside (not depicted) of an athletic bag. The material 200 comprises an inner fabric layer 202 and an outer layer 204. The outer layer 204 may contain antibacterial, antimicrobial, and antifungal properties to prevent bacteria, mold, and mildew growth on both the outside 206 and the inside 208 of the bag. The material 200 of the athletic bag may include an inner fabric layer 202 sandwiched between two outer layers 204 to allow the athletic bag to be reversible with antibacterial properties on both sides of the material 200. In the present embodiment, the inner fabric layer 202 is made of a vinyl material to allow for the bag to be both durable and flexible for storage and transport. In one embodiment, Silvertex vinyl may be used. In an alternative embodiment, marine vinyl may be used as the material 200. The marine vinyl may include silver embedded within the material and may therefore be reversible with antibacterial properties on both sides of the marine vinyl without the need for an outer layer 204.

The outer layer 204 may be a combination of a silver coating and vinyl-protective coating to allow greater antibacterial properties and protection to the material 200. In another embodiment, the outer layer 204 may include silver embedded within the outer layer 204. In yet another embodiment, the outer layer 204 may include a dual combination of silver embedding and silver and vinyl-protective coating. The combination vinyl-protection and silver embedding and coating layer may increase UV protection and prevent fading colors. In addition, the combination may provide stain and abrasion-resistant properties to the material 200.

In another embodiment, the inner fabric layer 202 may be made of polyurethane laminate ("PUL") to enhance flexibility and durability properties, and to allow the outside 206 and the inside 208 to be waterproof. Incorporating PUL into the inner fabric layer 202 may also minimize odors caused by use and transport of the bag. The outer layer 204 may also be a silver coating to prevent bacteria, mold/mildew, and fungal growth on the outside 206 and the inside 208. In yet another embodiment, the material 200 may include an inner fabric layer 202 made of silver-treated fabric with or without an outer coating layer. The silver treated fabric may provide flexibility to the athletic bag to store recreational items, but may also provide a higher percentage of silver to be incorporated into the fabric to increase the material's antimicrobial, antibacterial, and antifungal properties.

Figure 3:
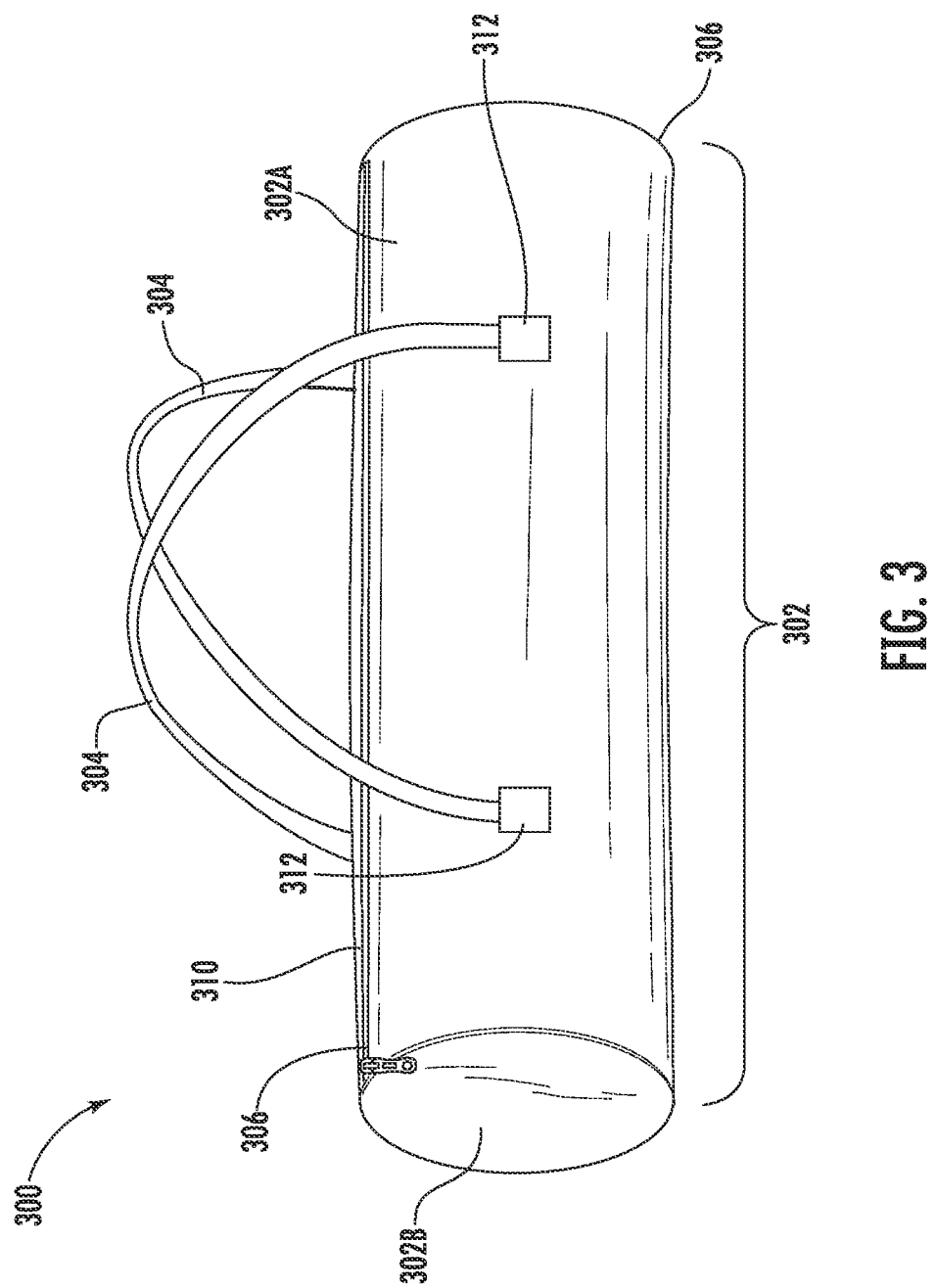
FIG. 3 is a diagram of a perspective view of an alternative embodiment of an athletic bag.

FIG. 3 is a diagram of a perspective view of an alternative embodiment of an athletic bag 300. The athletic bag 300 comprises a body 302 and a strap 304. In the present embodiment, the body 302 is cylindrical in shape. However, that is just by way of example. In other embodiments, the body 302 may be any shape. The body 302 comprises an exposed outside 306 and a non-exposed inside (not depicted). In the present embodiment, the body 302 is reversible. In other embodiments, the body 302 may not be reversible. The body 302 may include a combination of a silver coating and vinyl-protective coating. In another embodiment, the body 302 may include silver embedded within the body 302. In yet another embodiment, the body 302 may include a dual combination of silver embedding and silver and vinyl-protective coating. These features may allow greater antibacterial properties and protection to the athletic bag 300.

The body 302 includes a proximal portion 302A and parallel distal end portions 302B. The body 302 further includes a zipper 310 along the length of the proximal portion 302A to accommodate, store, and safely contain exercise mats and other recreational materials. The proximal portion 302A includes at least one set of latches 312 on the outside 306 and inside (not depicted) to attach and detach the strap 304. In the present embodiment, the proximal portion 302A includes two sets of latches 312 on opposite sides of the proximal portion 302A to accommodate two straps 304. The straps 304 may serve a dual-purpose as exercise bands, stretching bands, or other recreational or travel equipment to allow for the bag to be compact, but also provide travel convenience for recreational activities. The straps may be adjustable.

Figure 4:
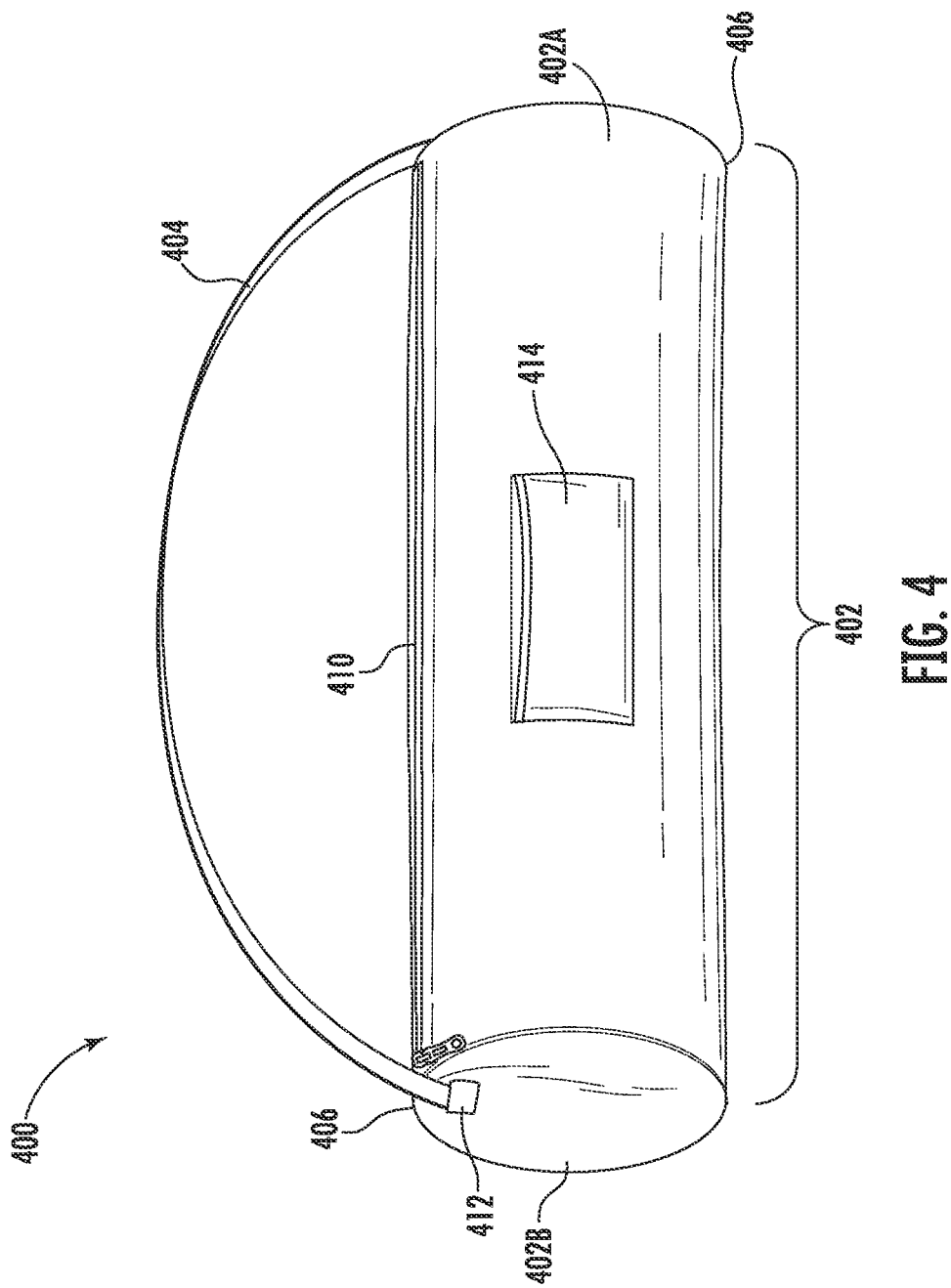
FIG. 4 is a diagram of a perspective view of an alternative embodiment of an athletic bag.

FIG. 4 is a diagram of a perspective view of an alternative embodiment of an athletic bag 400. The athletic bag 400 comprises a body 402 and a strap 404. In the present embodiment, the body 402 is cylindrical in shape. However, that is just by way of example. In other embodiments, the body 402 may be any shape. The body 402 comprises an exposed outside 406 and a non-exposed inside (not depicted). In the present embodiment, the body 402 is reversible. In other embodiments, the body 402 may not be reversible. The body 402 may include a combination of a silver coating and vinyl-protective coating. In another embodiment, the body 402 may include silver embedded within the body 402. In yet another embodiment, the body 402 may include a dual combination of silver embedding and silver and vinyl-protective coating. These features may allow greater antibacterial properties and protection to the athletic bag 400.

The body 402 includes a proximal portion 402A and similar parallel distal end portions 402B. The body 402 contains a zipper 410 along the length of the proximal portion 402A to accommodate and safely store exercise mats and other recreational materials. The distal end portions 402B include at least one set of latches 412 on the outside 406 and inside (not depicted) to attach and detach the strap 404. The strap 404 may serve a dual-purpose as exercise bands, stretching bands, or other recreational or travel equipment to allow for a compact bag and also provide travel convenience for recreational activities. The strap 404 may also be adjustable. In the present embodiment, the proximal portion 402A includes a pouch or insert 414 on the outside 406 and inside (not depicted) to store other items including exercise blocks, additional recreational items, food, medication, mobile devices, etc. for added storage.

Figure 5:
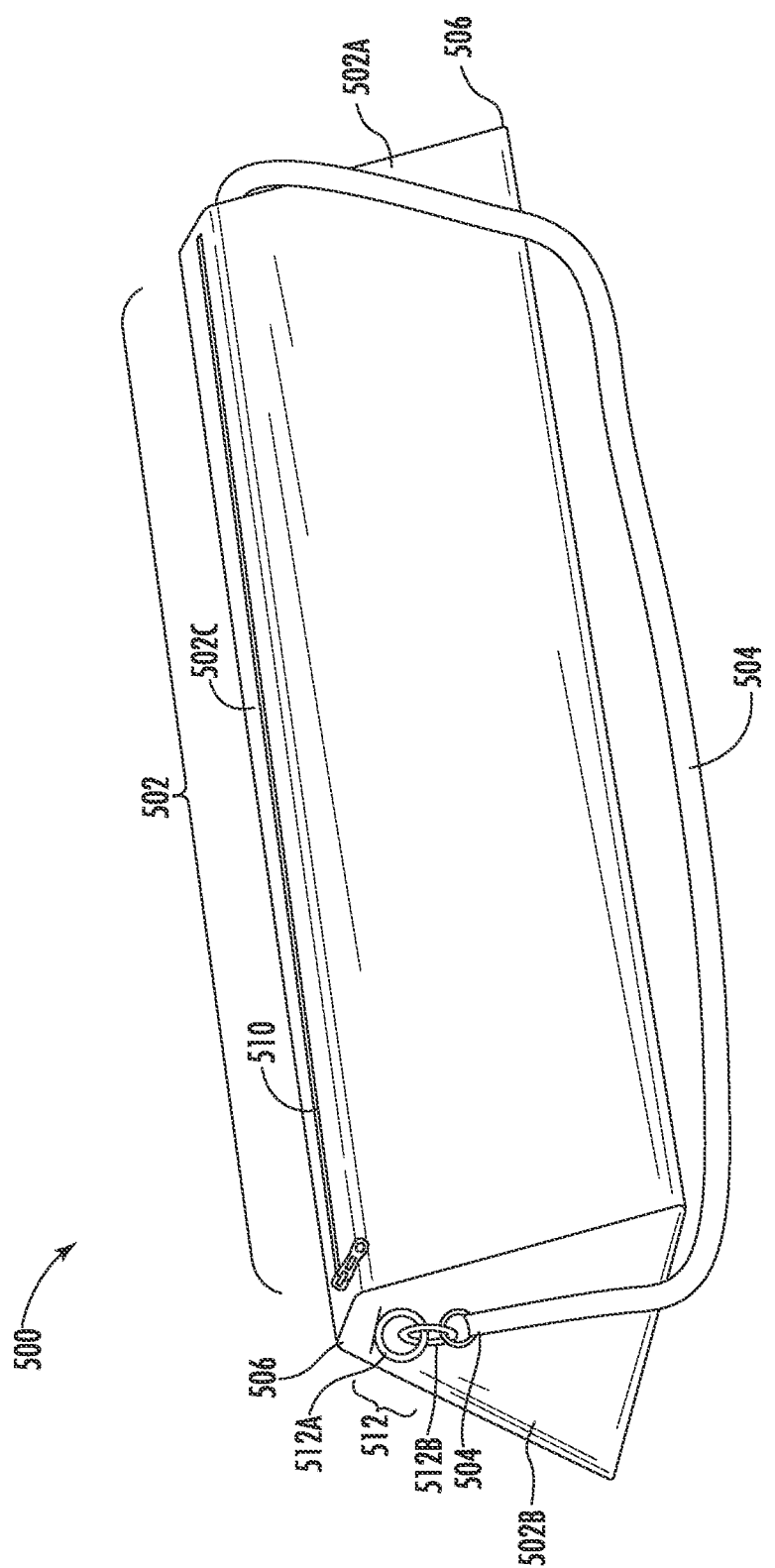
FIG. 5 is a diagram of a perspective view of an alternative embodiment of an athletic bag.

FIG. 5 is a diagram of a perspective view of an alternative embodiment of an athletic bag 500. The athletic bag 500 comprises a body 502 and a strap 504. The strap 504 may serve a dual-purpose as exercise bands, stretching bands, or other recreational or travel equipment to allow for a compact bag and also provide travel convenience for recreational activities. The strap 504 may also be adjustable. In the present embodiment, the body 502 may be similar in shape to a trapezoidal prism. However, that is just by way of example. In other embodiments, the body 502 may be any shape. The body 502 comprises an exposed outside 506 and a non-exposed inside (not depicted). In the present embodiment, the body 502 is reversible. In other embodiments, the body 502 may not be reversible. The body 502 may include a combination of a silver coating and vinyl-protective coating. In another embodiment, the body 502 may include silver embedded within the body 502. In yet another embodiment, the body 502 may include a dual combination of silver embedding and silver and vinyl-protective coating. These features may allow greater antibacterial properties and protection to the athletic bag 500.

In the present embodiment, the body 502 comprises three similar proximal faces 502A, two similar parallel distal end faces 502B, and a top proximal face 502C. The top proximal face 502C of the body 502 includes a zipper 510 to close and secure recreational equipment. The zipper 510 may be mold/mildew resistant. Both the outside 506 and the inside (not depicted) of the body 502 include latches 512 to attach and detach the strap 504. In the present embodiment, the latches 512 comprise a grommet ring 512A and a clip 512B attached to both the ring 512A of the body 502 and the strap 504. In the present embodiment, the clip 512B may be a carabiner clip. However, that is just by way of example. In other embodiments, any clip may be utilized. The ring 512A and clip 512B attachment may allow more efficient insertion and removal of the strap 504 on the athletic bag 500 for transportation and exercise use.

Figure 6:
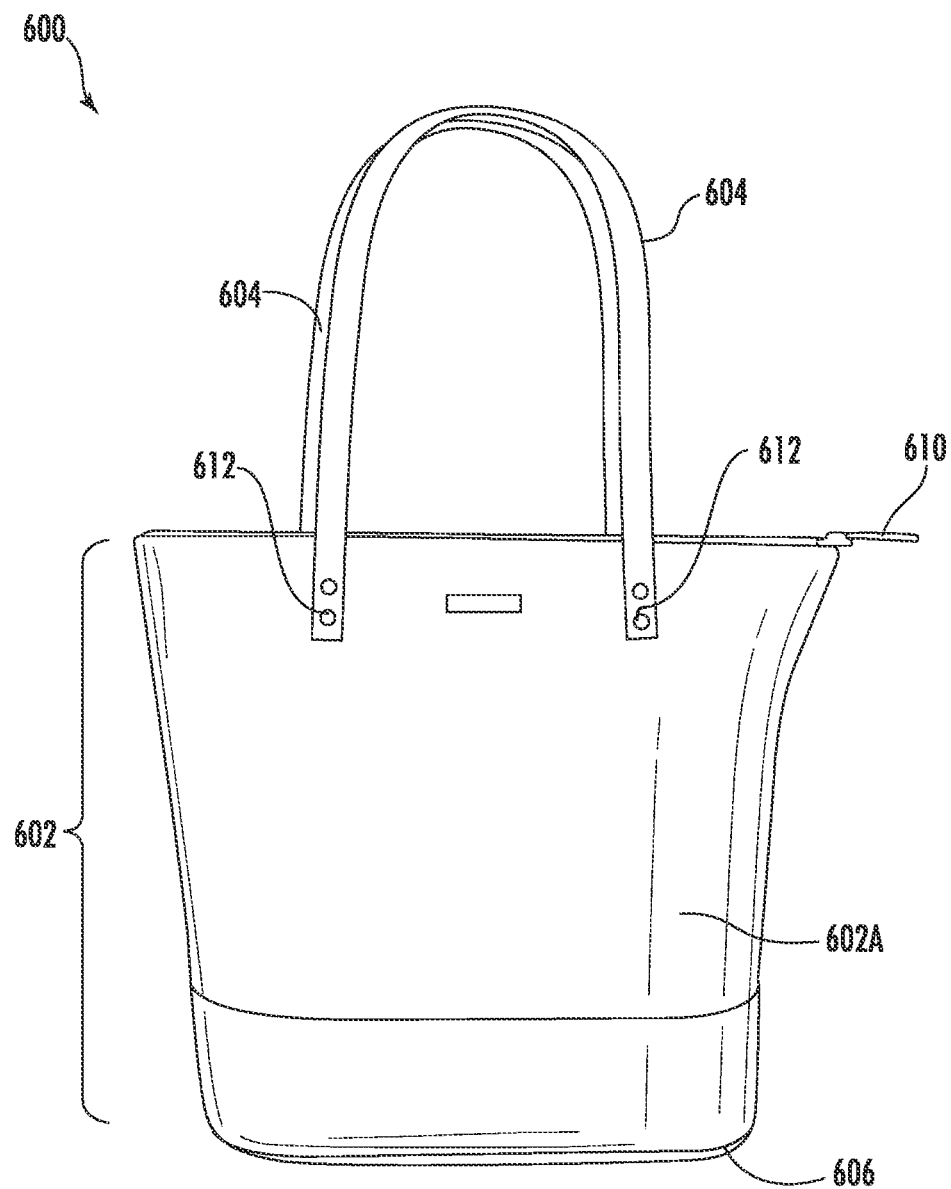
FIG. 6 is a diagram of a perspective view of an embodiment of a hand bag.

FIG. 6 is a diagram of a perspective view of an embodiment of a hand bag 600. The hand bag 600 comprises a body 602 and one or more straps 604. In the present embodiment, the body 602 may be rectangular in shape. However, that is just by way of example. In other embodiments, the body 602 may be any shape. The body 602 comprises two similar parallel faces 602A. In the present embodiment, the body 602 further comprises an exposed outside 606 and a non-exposed inside (not depicted). In the present embodiment, the body 602 is reversible. In other embodiments, the body 602 may not be reversible. The body 602 may include a combination of a silver coating and vinyl-protective coating. In another embodiment, the body 602 may include silver embedded within the body 602. In yet another embodiment, the body 602 may include a dual combination of silver embedding and silver and vinyl-protective coating. These features may allow greater antibacterial properties and protection to the hand bag 600.

In the present embodiment, the body 602 further comprises a zipper 610 along the top portions of the parallel faces 602A to close and secure recreational and travel items contained within the hand bag 600. The zipper 610 may be mold/mildew resistant. In another embodiment, the body 602 may further comprise a latch at the top center portions of the parallel faces 602A to close and secure items contained in the hand bag 600. The parallel faces 602A also include at least one set of latches 612 on the outside 606 and inside (not depicted) to attach and detach the strap 604. In the present embodiment, the parallel faces 602A include two sets of latches 612 on opposite sides of the parallel faces 602A to accommodate two straps. The straps 604 may serve a dual-purpose as exercise bands, stretching bands, or other recreational or travel equipment to allow for the bag to be compact, but also provide travel convenience for recreational activities. The straps 604 may also be adjustable.

Figure 7:
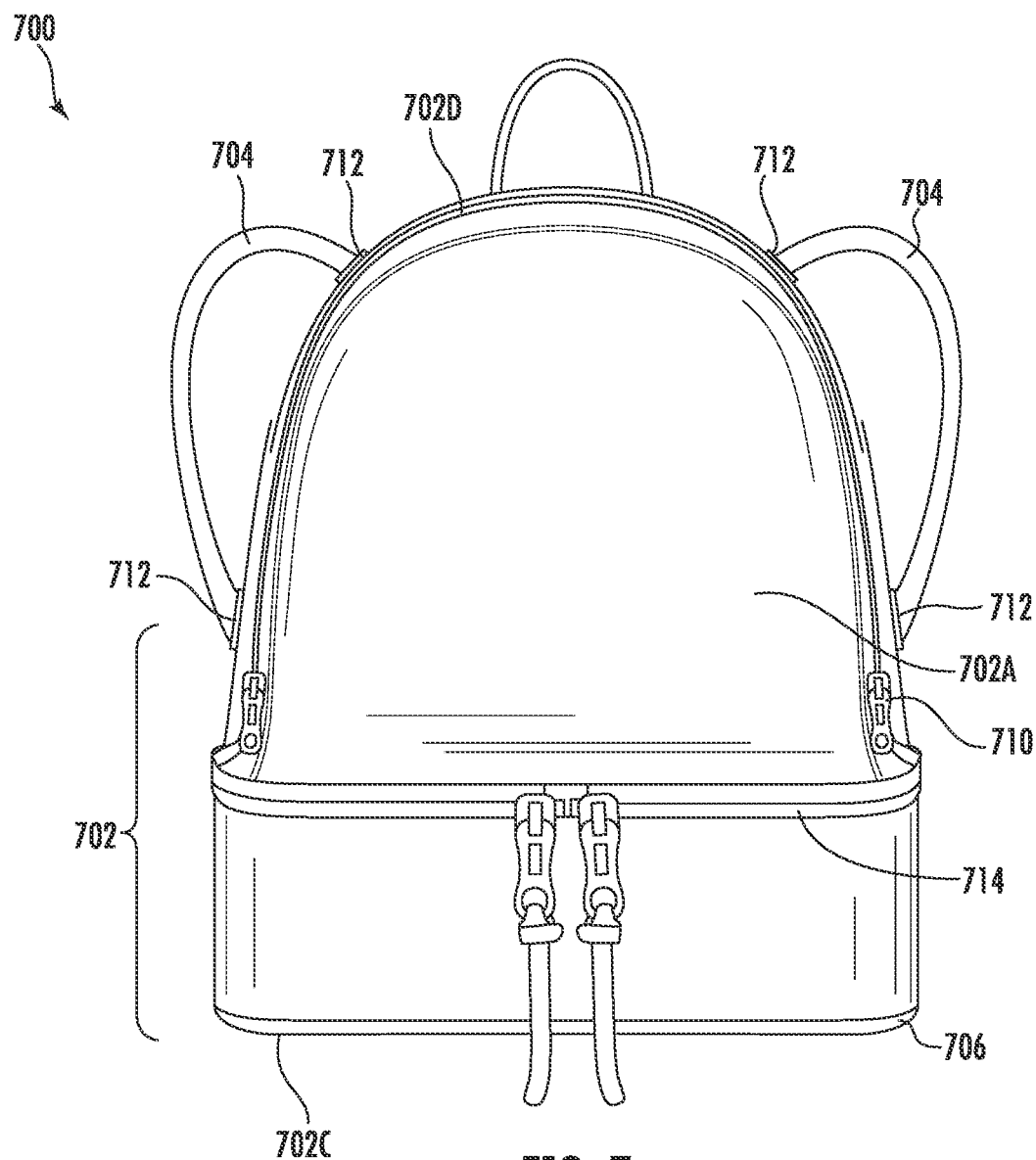
FIG. 7 is a diagram of a perspective view of an embodiment of a backpack.

FIG. 7 is a diagram of a perspective view of an embodiment of a backpack 700. The backpack 700 comprises a body 702 and one or more straps 704 attached to the body. In the present embodiment, the body 702 comprises an exposed outside 706 and a non-exposed inside (not depicted). In the present embodiment, the body 702 may be reversible. In other embodiments, the body 702 may not be reversible. The body 702 may include a combination of a silver coating and vinyl-protective coating. In another embodiment, the body 702 may include silver embedded within the body 702. In yet another embodiment, the body 702 may include a dual combination of silver embedding and silver and vinyl-protective coating. These features may allow greater antibacterial properties and protection to the backpack 700.

In the present embodiment, the body 702 further comprises a front face 702A, a back face (not depicted) similar in shape to the front face 702A, a bottom face 702C, and a top face 702D. The top face 702D of the body 702 is in the shape of an arch and includes a zipper 710 to close and secure recreational equipment. The zipper 710 may be mold/mildew resistant. Both the outside 706 and the inside (not depicted) of the body 702 include latches 712 to attach and detach the one or more straps 704. In the present embodiment, the back face 702B includes two sets of latches 712 to accommodate two straps 704. The one or more straps 704 may serve a dual-purpose as exercise bands, stretching bands, or other recreational or travel equipment to allow for the backpack 700 to be compact, but also provide travel convenience for recreational activities. The one or more straps 704 may also be adjustable. The body 702 may also include an additional zipper 714 across the front face 702A on both the outside 706 and the inside 708 of the body 702 to store additional recreational and travel items.

Figure 8:
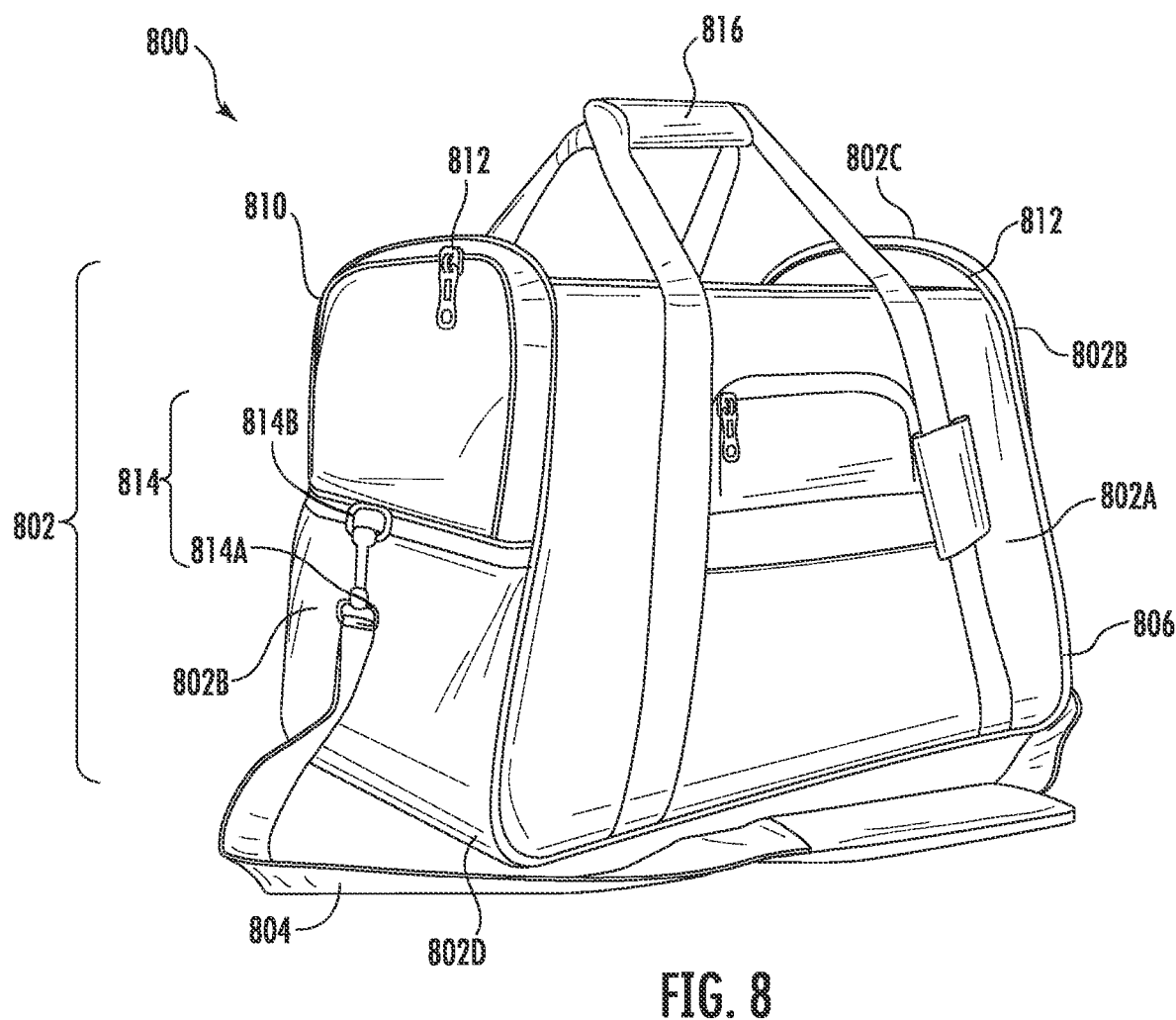
FIG. 8 is a diagram of a perspective view of an embodiment of an athletic equipment bag.

FIG. 8 is a diagram of a perspective view of an embodiment of an athletic equipment bag 800. The athletic equipment bag 800 comprises a body 802 and a strap 804. In the present embodiment as described hereinafter, the body 802 may be similar in shape to a trapezoidal prism. However, this is just by way of example. In other embodiments, the body 802 may be any shape.

The athletic equipment bag 800 may serve a dual purpose as a pet carrier. The body 802 comprises an exposed outside 806 and a non-exposed inside (not depicted). The inside 808 of the body 802 may include a compartment 810 to place small pets in order to easily carry and transport pets in addition to storing travel and recreational items. The body 802 may include a combination of a silver coating and vinyl-protective coating. In another embodiment, the body 802 may include silver embedded within the body 802. In yet another embodiment, the body 802 may include a dual combination of silver embedding and silver and vinyl-protective coating. These features may allow greater antibacterial properties and protection to the athletic equipment bag 800 and provide a safe environment for small pets.

In the present embodiment, the body 802 further comprises two similar parallel proximal faces 802A, two similar distal end faces 802B, a top proximal face 802C, and a bottom proximal face 802D. The top of the two similar distal end faces 802B of the body 802 includes zippers 812 to close and secure recreational equipment. The zippers 812 may be mold/mildew resistant. Both the outside 806 and the inside (not depicted) of the body 802 include latches 814 to attach and detach the strap 804. In the present embodiment, the latches 814 may comprise a grommet ring 814A and a clip 814B attached to both the ring 814A of the distal end face 802B of the body 802 and the strap 804. In the present embodiment, the clip 814B may be a carabiner clip, but that is just by way of example. The ring 814A and clip 814B attachment may allow more efficient insertion and removal of the strap 804 on the athletic equipment bag 800 for transportation and exercise use. The strap 804 may also be adjustable. In the present embodiment, the body 802 may also include carrying straps 816 attached to a top center portion of the proximal faces 802A for easier carrying and handling of the athletic equipment bag 800.

Figure 9:
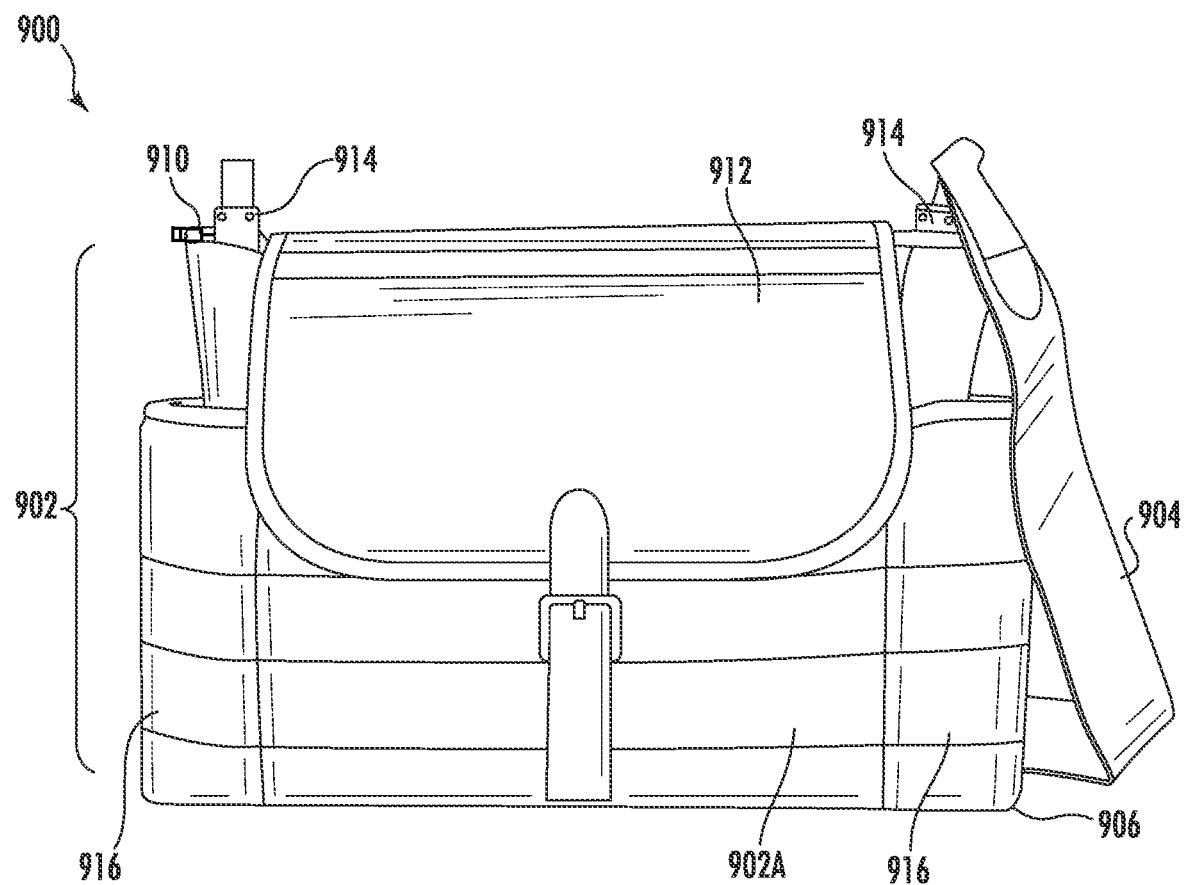
FIG. 9 is a diagram of a perspective view of an alternative embodiment of a hand bag.

FIG. 9 is a diagram of a perspective view of an alternative embodiment of a hand bag 900. The hand bag 900 comprises a body 902 and a strap 904. In the present embodiment, the body 902 may be rectangular in shape. However, this is just by way of example. In other embodiments, the body 902 may be any shape. The body 902 comprises a front face 902A and a back face (not depicted). In the present embodiment, the body 902 comprises an exposed outside 906 and a non-exposed inside (not depicted). The inside 908 may include a combination of a silver coating and vinyl-protective coating. In another embodiment, the inside 908 may include silver embedded within the body 902. In yet another embodiment, the inside 908 may include a dual combination of silver embedding and silver and vinyl-protective coating. These features may allow greater antibacterial properties and protection to the hand bag 900.

In the present embodiment, the body 902 further comprises a zipper 910 along the top portions of the front face 902A and back face 902B to close and secure recreational and travel items contained within the hand bag 900. The zipper 910 may be mold/mildew resistant. The body 902 further includes a front flap 912 that is attached to the back face 902B and lies over the zipper 910 and attaches to the front face 902A to further secure items contained in the hand bag 900. The body 902 further includes one or more pocket 916 on the outer surface of the body 902 to store recreational equipment and travel items. In one embodiment, the pocket 916 may include a thermal pouch to keep beverages or other items at cooler temperatures. The thermal pouch may be located on either the exposed outside 906 of the body 902 or the unexposed inside 908 of the body 902. It should be noted that the thermal pouch may be included in any of the embodiments herein.

The front face 902A and the back face 902B include at least one set of latches 914 on the inside 908 and the outside 906 of the body 902 to attach and detach the strap 904. The strap 904 may serve a dual-purpose as exercise bands, stretching bands, or other recreational or travel equipment to allow for the bag to be compact, but also provide travel convenience for recreational activities. The strap 904 may also be adjustable.

Figure 10:
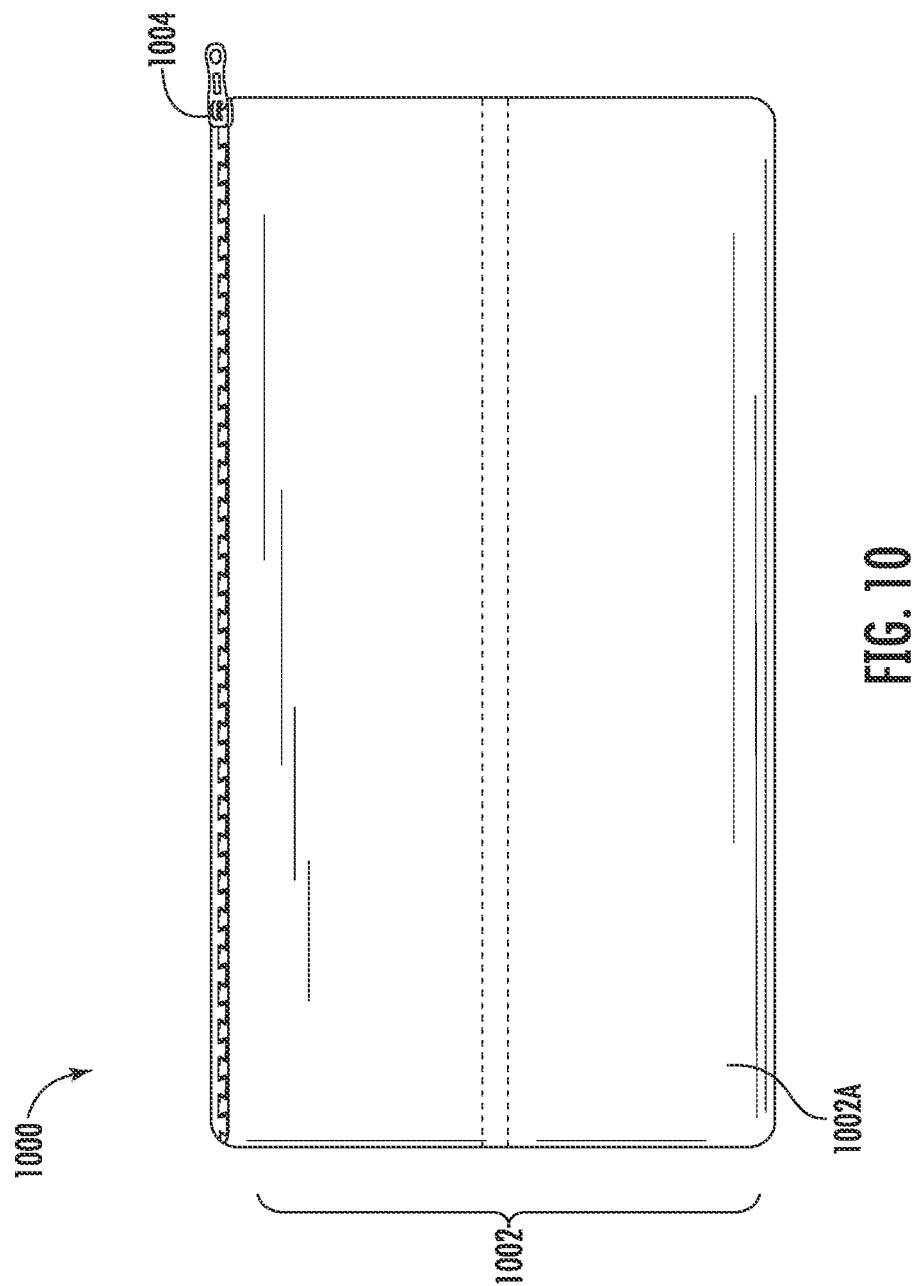
FIG. 10 is a diagram of a perspective view of an alternative embodiment of an athletic bag.

FIG. 10 is a diagram of a perspective view of an alternative embodiment of an athletic bag 1000. The athletic bag 1000 comprises a body 1002. In the present embodiment, the body 1002 is rectangular in shape and comprises two similar parallel faces 1002A. The body 1002 may include a combination of a silver coating and vinyl-protective coating. In another embodiment, the body 1002 may include silver embedded within the body 1002. In yet another embodiment, the body 1002 may include a dual combination of silver embedding and silver and vinyl-protective coating. The body 1002 further comprises a zipper 1004 along the top portions of the faces 1002A to close and secure recreational and travel items contained within the athletic bag 1000. The zipper 1004 may be mold/mildew resistant.

Figure 11:
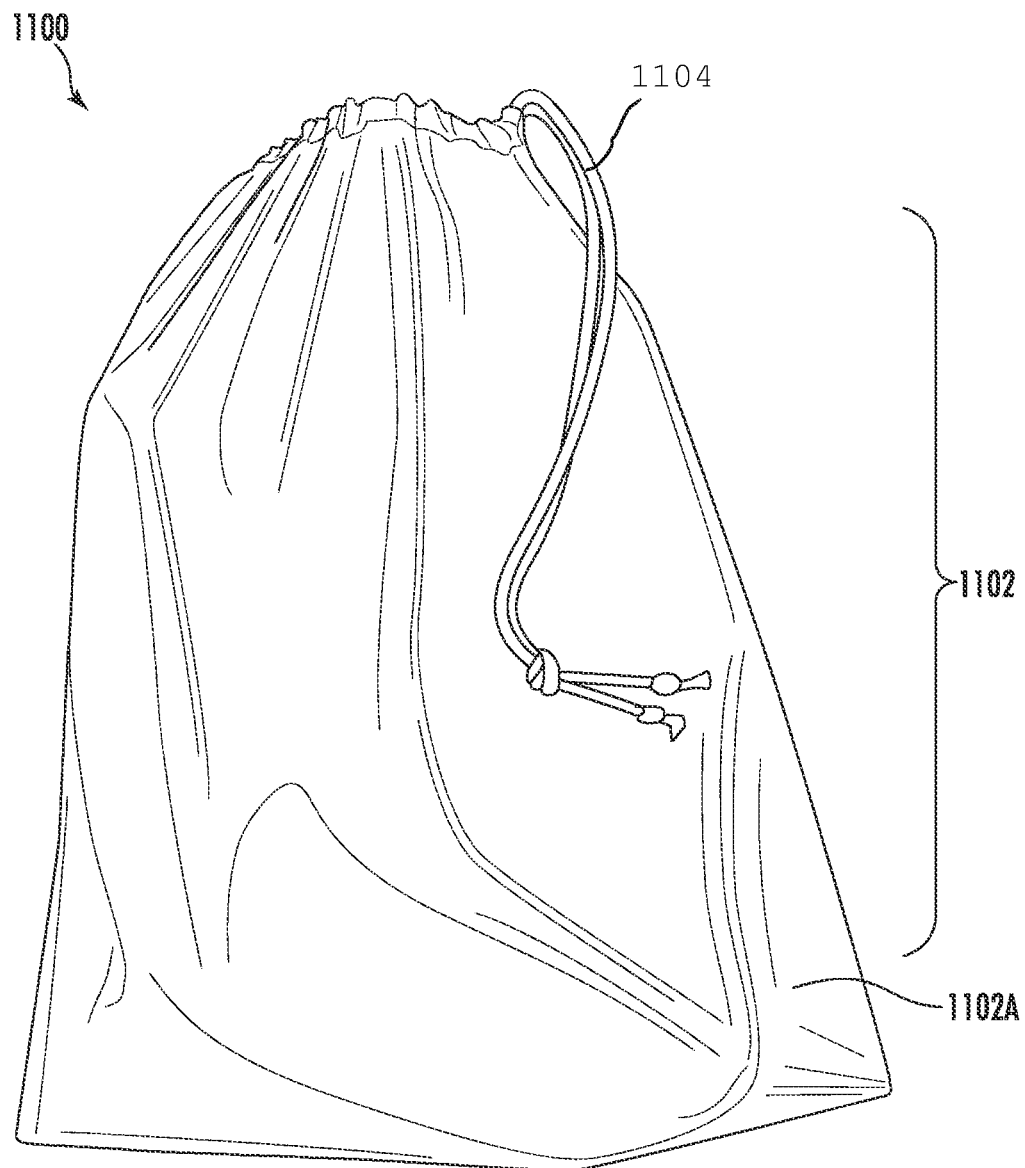
FIG. 11 is a diagram of a perspective view of an alternative embodiment of an athletic equipment bag.

FIG. 11 is a diagram of a perspective view of an alternative embodiment of an athletic bag 1100. The athletic bag 1100 comprises a body 1102. In the present embodiment as described hereinafter, the body 1102 may be rectangular in shape. The body 1102 further comprises two similar parallel faces 1102A. The body 1102 may also further comprise a drawstring 1104 along the top portions of the faces 1102A to secure and keep items contained within the athletic bag 1100. The body 1102 may include a combination of a silver coating and vinyl-protective coating. In another embodiment, the body 1102 may include silver embedded within the body 1102. In yet another embodiment, the body 1102 may include a dual combination of silver embedding and silver and vinyl-protective coating. The body 1102 may be waterproof. The athletic bag 1100 may efficiently accommodate, store, and safely contain both wet and dry recreational and travel materials.

Figure 12:
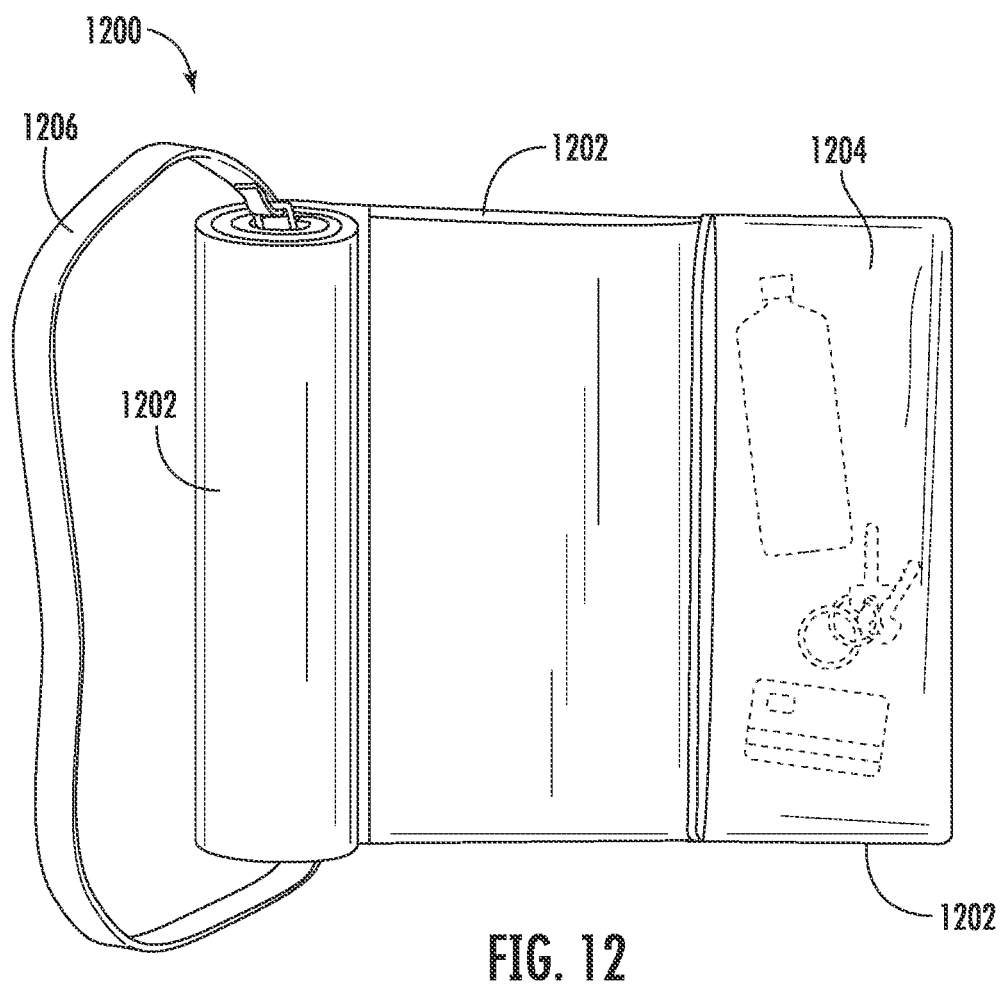
FIG. 12 is a diagram of a perspective view of an alternative embodiment of an athletic bag.

FIG. 12 is a diagram of a perspective view of an alternative embodiment of an athletic bag 1200. The athletic bag 1200 may serve a dual purpose as an exercise mat wrap. The athletic bag 1200 comprises a body 1202 that can be rolled out and extended lengthwise. The body 1202 comprises a hood 1204 along one end of the body 1202 to secure and protect exercise mats, blankets, or other recreational or travel items when rolled up in the athletic bag 1200. In the present embodiment, the body 1202 is rectangular in shape. However, this is just by way of example. In other embodiments, the body 1202 may be any shape. The body 1202 may include a combination of a silver coating and vinyl-protective coating. In another embodiment, the body 1202 may include silver embedded within the body 1202. In yet another embodiment, the body 1202 may include a dual combination of silver embedding and silver and vinyl-protective coating. These features may allow greater antibacterial properties and protection to the athletic bag 1200. In one embodiment, the body 1202 may further include detachable straps 1206 connected by latches 1206 on either side of the body 1202 for easier carrying.

Figure 13:
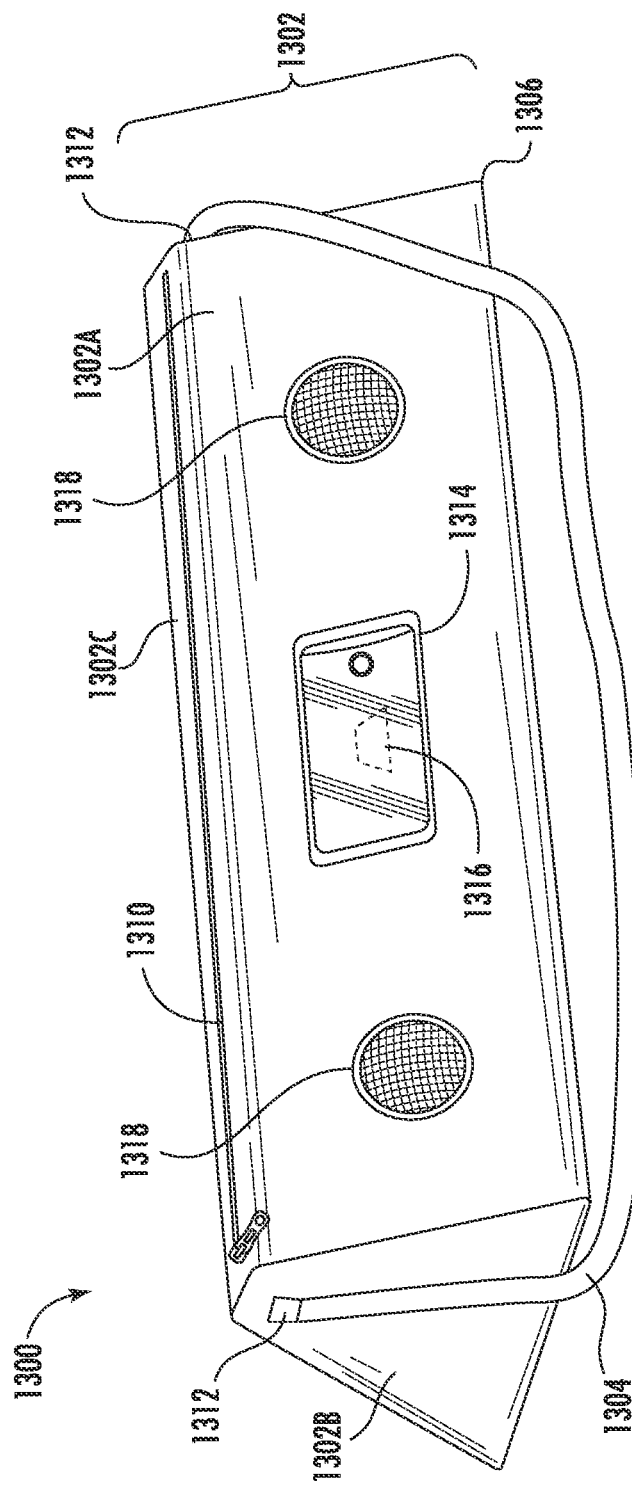
FIG. 13 is a diagram of a perspective view of an alternative embodiment of an athletic bag.

FIG. 13 is a diagram of a perspective view of an alternative embodiment of an athletic bag 1300. The athletic bag 1300 comprises a body 1302 and a strap 1304. In the present embodiment, the body 1302 may be similar in shape to a trapezoidal prism. However, this is just by way of example. In other embodiments, the body 1302 may be any shape. The body 1302 comprises an exposed outside 1306 and a non-exposed inside (not depicted). In the present embodiment, the outside 1306 and inside 1308 are not reversible. The body 1302 may include a combination of a silver coating and vinyl-protective coating. In another embodiment, the body 1302 may include silver embedded within the body 1302. In yet another embodiment, the body 1302 may include a dual combination of silver embedding and silver and vinyl-protective coating. These features may allow greater antibacterial properties and protection to the athletic bag 1300.

In the present embodiment, the body 1302 further comprises three similar proximal faces 1302A, two similar parallel distal end faces 1302B, and a top proximal face 1302C. The top proximal face 1302C of the body 1302 includes a zipper 1310 to close and secure recreational equipment. The zipper 1310 may be mold/mildew resistant.

Both the outside 1306 and the inside (not depicted) of the body 1302 include latches 1312 to attach and detach the strap 1304. In the present embodiment, the body 1302 includes a transparent frame 1314 on the outside of the body 1302 to house and secure mobile devices such as a smart phone or tablet. This feature allows a user to view a mobile device easily while traveling or during recreational activities. In the present embodiment, the transparent frame 1314 may include a pull-out stand 1316 to situate the mobile device or tablet for easier viewing.

In another embodiment, the transparent frame 1314 may include speakers 1318 on the body 1302 that may connect to a mobile device via wires or wirelessly to allow users to play audio recordings while traveling or during recreational activities.

Figure 14:
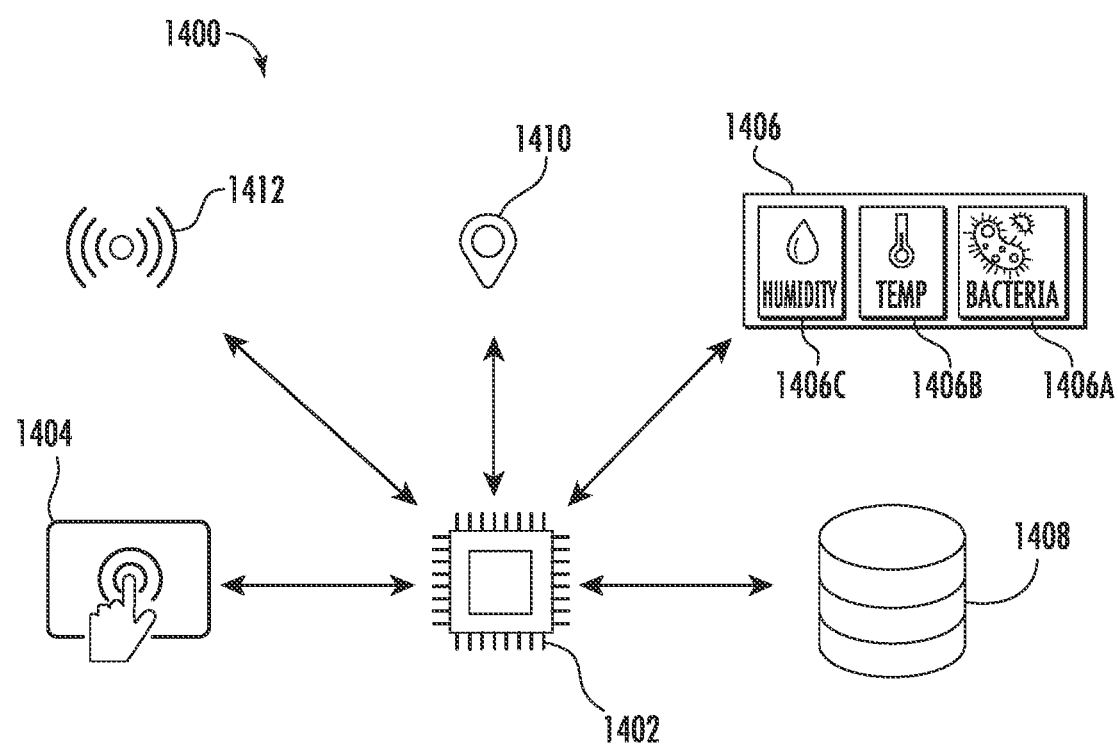
FIG. 14 is a communication diagram of an antibacterial monitoring mechanism.

In one embodiment, the body 1302 includes an antibacterial monitoring mechanism to monitor environmental presence of bacteria, fungus, mold or mildew. The antibacterial monitoring mechanism may be embedded into a central portion of the body 1302 and may report bacteria data and detection updates on a selected periodic basis. It should be noted that the antibacterial monitoring mechanism may be included in any of the embodiments herein. The communicative connections of the antibacterial monitoring mechanism are graphically shown in FIG. 14. The antibacterial monitoring mechanism 1400 includes a processor 1402, a user interface 1404, a plurality of sensors 1406, and a memory 1408. The processor 1402 may be communicatively linked to the sensors 1406. In the present embodiment, the plurality of sensors 1406 may include a bacteria sensor 1406A, a temperature sensor 1406B, and a humidity sensor 1406C. In other embodiments, the sensors 1406 may include other types of sensors. The sensors 1406 may detect and measure the temperature, humidity, and amount of bacteria, mold, mildew, or microbial growth inside the bag. The sensors 1406 may send this data to the processor 1402. The processor may store this data in the memory 1408.

The processor 1402 is communicatively coupled to the user interface 1404. The processor 1402 may instruct the user interface 1404 to display the measured data from the sensors 1406. The processor 1402 may also instruct the user interface 1404 to display information stored in the memory 1408. In addition, the processor 1402 may instruct the user interface 1404 to display alert messages when the measurements exceed a user-inputted or pre-established threshold. The user interface 1404 may be a discrete device like a mobile phone application.

The processor 1402 may also be communicatively linked to a geo locating system 1410. The geo locating system 1410 may be able to determine the location of the bag based on a locating standard such as the Global Positioning System (GPS) or Galileo. This configuration may help track the location of a bag if the bag is lost or stolen. The processor 1402 may also be communicatively linked to a motion detector 1412. The motion detector 1412 can monitor a change in motion of the bag. If the bag begins to move, the motion detector 1412 may send the measured data to the processor 1402. The processor 1402 can then instruct the user interface 1404 to provide an alert that the bag is in motion. These configurations may help track the location of a bag if the bag is lost or stolen.

The processor 1402 may be programmed to provide a plurality of helpful alerts to the user. In one example, the processor 1402 may send the user a text via the user interface 1404 to remind the user to exercise if the bag has not moved in a predetermined amount of time. The processor 1402 may also send similar alerts in the event it detects mold or mildew, and it is time for the user to clean the bag. The processor 1402 may notify the user of the location of the bag in the event that the user cannot find it and sends an instruction to the processor 1402 to send its location. In this manner, the processor 1402 ensures that the user is always ready to work out in a safe, timely and effective manner.

FIG. 15 is a diagram of a perspective view of an alternative embodiment of an athletic bag 1500. The athletic bag 1500 comprises a body 1502 and a strap 1504. In the present embodiment, the body 1502 may be similar in shape to a rectangular prism. However, that is just by way of example. In other embodiments, the body 1502 may be any shape. The body 1502 comprises an exposed outside 1506 and a non-exposed inside 1508. In the present embodiment, the body 1502 further comprises three similar proximal faces 1502A, two similar distal end faces 1502B, and a top proximal face 1502C. The top proximal face 1502C of the body 1502 may include a zipper 1514 to close and secure recreational equipment. The zipper 1514 may be mold/mildew resistant. Both the outside 1506 and the inside 1508 of the body 1502 may include latches 1512 to attach and detach the strap 1504.

The athletic bag 1500 may be used to store an exercise mat and wrap 1510. The exercise mat and wrap 1510 may be attached to the inside 1508 of the body 1502. In the present embodiment, the body 1502 is reversible. The body 1502 may include a combination of a silver coating and vinyl-protective coating. In another embodiment, the body 1502 may include silver embedded within the body 1502. In yet another embodiment, the body 1502 may include a dual combination of silver embedding and silver and vinyl-protective coating. Storing the exercise mat and wrap 1510 in the body 1502 of the athletic bag 1500 may therefore help to decontaminate the exercise mat and wrap 1510 due to the antibacterial and antimicrobial properties of the body 1502.

The exercise mat and wrap 1510 can be rolled out and extended lengthwise. The exercise mat and wrap 1510 may comprise a hood 1518 along one end of the exercise mat and wrap 1510 to secure and protect other recreational or travel items when rolled up in the athletic bag 1500.

Having thus described the presently preferred embodiments in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiments and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

What is claimed is:

1. An athletic bag comprising:
    a reversible body comprising a first portion having a first set of latches and a second portion having a second set of latches, and
    at least one detachable, dual-purpose strap;
    whereby with the body in a first configuration the first portion comprises the outside of the bag, the second portion comprises the inside of the bag, and the dual-purpose strap engages the first set of latches, and with the body in a second configuration the second portion comprises the outside of the bag, the first portion comprises the inside of the bag, and the dual purpose strap engages the second set of latches;

whereby the body and the dual-purpose strap are antibacterial, antimicrobial, and antifungal; and whereby the at least one detachable dual-purpose strap can be used as an exercise band.

2. The athletic bag of claim 1, wherein the body comprises a proximal portion and distal end portions.

3. The athletic bag of claim 2, wherein the body further comprises a zipper configured to extend along the proximal portion.

4. The athletic bag of claim 2, wherein the proximal portion comprises the first and second set of latches configured to attach and detach the strap.

5. The athletic bag of claim 2, wherein the distal end portions comprise the first and second set of latches configured to attach and detach the strap.

6. The athletic bag of claim 1, wherein the body is made of marine vinyl with an antibacterial coating.

7. The athletic bag of claim 1, wherein the body is made of an antibacterial-embedded marine vinyl.

8. The athletic bag of claim 1, wherein the body is made of polyurethane laminate with a silver coating.

9. The athletic bag of claim 1, wherein the body is made of polyurethane laminate embedded with silver.

10. The athletic bag of claim 1, wherein the body further comprises an exposed portion and non-exposed portion.

11. The athletic bag of claim 10, wherein both the exposed portion and the non-exposed portion are antibacterial, antimicrobial, and antifungal.

12. The athletic bag of claim 1, wherein the at least one detachable dual-purpose strap is adjustable.

13. The athletic bag of claim 1, wherein the at least one detachable dual-purpose strap is made from a material with antibacterial, mold/mildew-resistant, and water-resistant webbing.

* * * * *